Dec. 12, 1944.           N. E. BRICE           2,364,775
                        STRAINER SYSTEM
                     Filed July 22, 1941           2 Sheets-Sheet 1
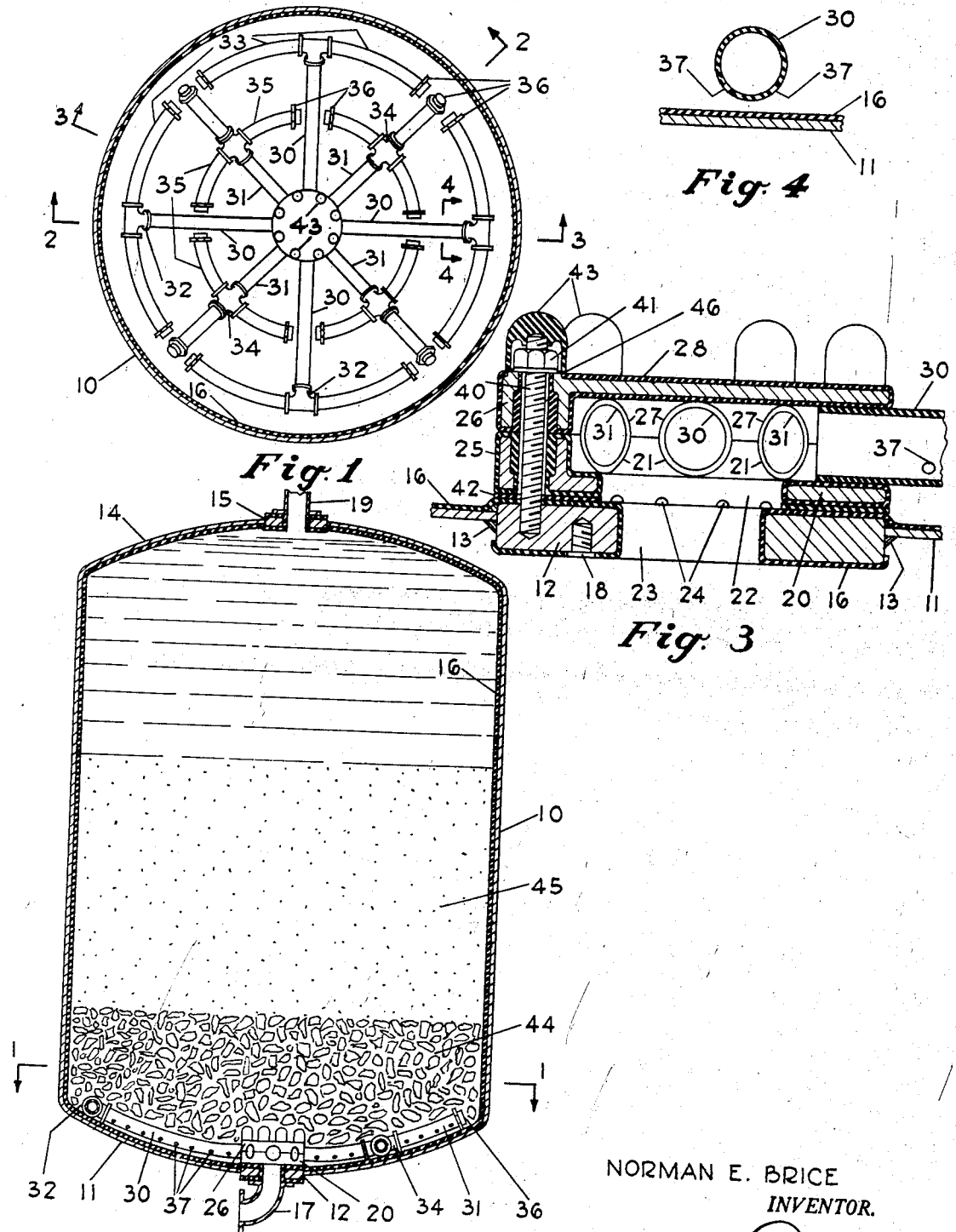
NORMAN E. BRICE
INVENTOR.
BY
ATTORNEY.

Dec. 12, 1944.
N. E. BRICE
2,364,775
STRAINER SYSTEM
Filed July 22, 1941
2 Sheets-Sheet 2
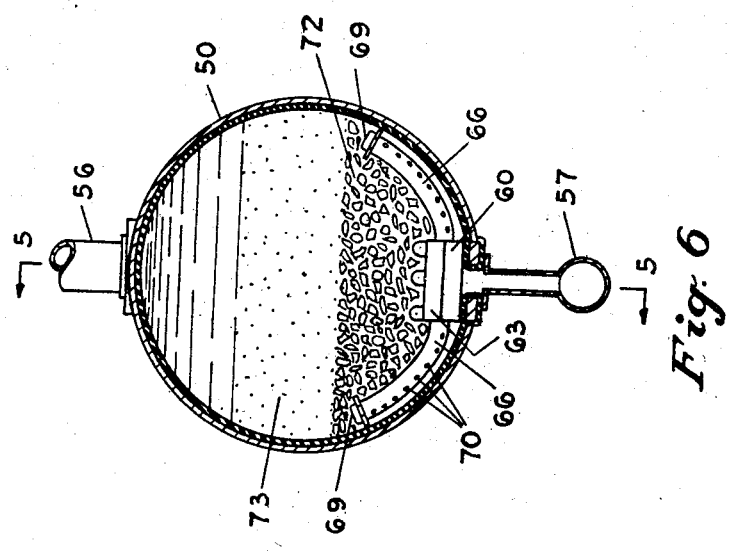
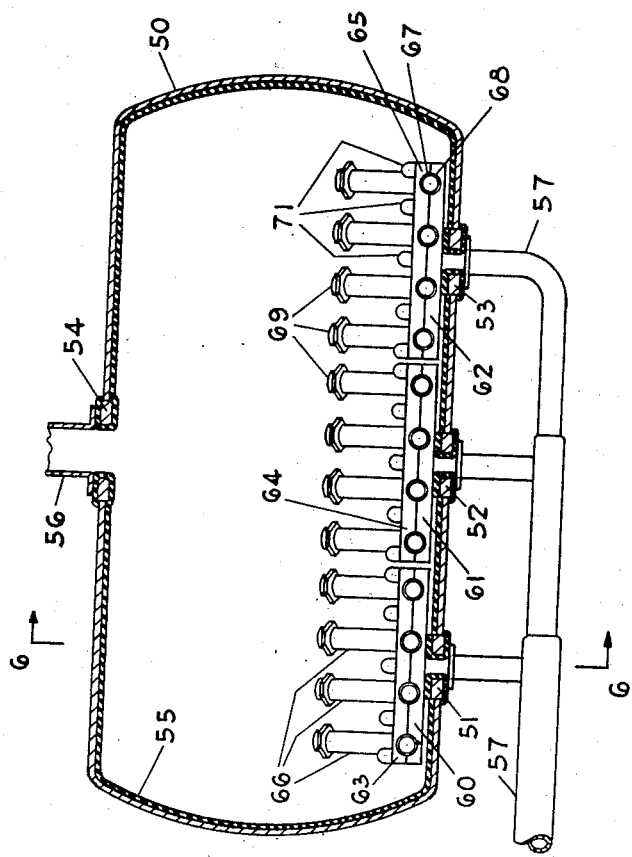
NORMAN E. BRICE
*INVENTOR.*
BY *Eric Pick*
ATTORNEY.

Patented Dec. 12, 1944

2,364,775

UNITED STATES PATENT OFFICE 2,364,775

STRAINER SYSTEM

Norman E. Brice, Millburn, N. J., assignor to The Permutit Company, New York, N. Y., a corporation of Delaware Application July 22, 1941, Serial No. 403,505

6 Claims. (Cl. 210—171)

This invention relates to a strainer system for a tank; and it comprises two members forming a header, complementary notches in each of said members, a plurality of tubes adjacent the lower portion of the tank, each tube having one end located in one notch of one of said members and in a complementary notch of the other member, means for clamping said two members together with said tubes therebetween, fluid distributing means on said tubes, and a passage for liquid extending from said header to the outside of the tank, all as more fully described hereinafter and as claimed.

In recent years there have come into use for the treatment of water organic cation exchange materials, such as sulfonated coal, charged with either hydrogen or sodium ions. In using these materials, the water to be treated is usually passed downwardly through a bed of the material in granular form whereby the cations in the water are exchanged for the cations with which the material had been charged. Upon exhaustion of the exchange capacity of the material the bed is cleansed of impurities and re-graded by a backwash operation, i. e. an upward flow of water through the bed at a relatively high rate. Thereupon the bed is regenerated by passing through it, usually in a downward direction, the dilute solution of a regenerant, sulfuric acid or the like when the exchangeable cation is hydrogen, or sodium chloride when the exchangeable cation is sodium. Finally, the bed is rinsed free of the waste products of the regeneration process and of excess regenerant by a flow of water to waste, usually in a downward direction, whereupon the bed of cation exchange material is in condition for the treatment of a further quantity of water.

Formerly, only inorganic materials charged with sodium or other metallic ions were employed for the treatment of water by ion exchange. These materials, represented by synthetically produced sodium aluminum silicates, processed glauconite etc., were of such nature that a bed of them in granular form offered appreciable resistance to the flow of water so that the bed itself was effective in uniformly distributing the flow of water and regenerant through the bed.

The new organic cation exchange materials, however, differs from the aforesaid inorganic materials in that a bed of the organic materials in granular form offers relatively little resistance to the flow of liquid. Therefore, unless special precautions are taken, the water and regenerant will not pass uniformly through the bed, bringing about premature exhaustion of certain portions of the bed and non-uniform regeneration of the bed, thus resulting in poor efficiency of the treating process. In rinsing cation exchange materials charged with hydrogen ions subsequent to regeneration it is important that the materials be freed very thoroughly of excess regenerant since otherwise the water initially sent to use would contain any excess regenerating acid left in the bed at the end of the rinse step. Efficient and thorough rinsing of the bed without waste of the cation exchange capacity, however, is only possible with effective distribution and collection of the rinse water.

Another problem arising from the use of organic cation exchange materials charged with hydrogen ions is that the treated water is of an acid character, containing hydrochloric, sulfuric and carbonic acid in amounts depending upon the chloride, sulfate and carbonate content of the water prior to treatment, and that the dilute solution of an acid, usually sulfuric acid, is used as a regenerant. These acids would, in short order, destroy the tank containing the exchange material as well as the strainer system if they were made of steel, cast iron, brass and bronze, materials which have been employed with entirely satisfactory results in the use of cation exchange materials charged with sodium ions.

It is an object of this invention to provide a strainer system which will, with great uniformity, collect water and regenerant from a bed of ion exchange material and distribute backwash water through such bed. Another object is to provide an efficient, simple and inexpensive strainer system which is not subject to corrosive attack by dilute acids.

The manner in which the aforesaid objects are achieved is shown in the appended drawings in which:

Fig. 1 is a plan view, partly in section along line 1—1 of Fig. 2, of a strainer system according to my invention;

Fig. 2 is an elevation, partly in section along line 2—2 of Fig. 1;

Fig. 3 is a section of the header, on a larger scale, taken along line 3—3 of Fig. 1;

Fig. 4 is a section along line 4—4 of Fig. 1;

Fig. 5 is an elevation of another form of my invention, partly in section along line 5—5 of Fig. 6; and Fig. 6 is a section along line 6—6 of Fig. 5.

Like numerals refer to like parts throughout the several views.

Referring now to the form of my invention shown in Figs. 1 to 4, an upright cylindrical steel tank 10 with a dished bottom 11 has a flange 12 secured to the bottom, as by welding 13. The top 14 of the tank is provided with a flange 15. The entire inside of tank 10 is covered with a rubber lining 16 which extends through and around the flanges 12 and 15. The rubber lining 16, advantageously in the form of relatively soft rubber sheets vulcanized to the steel of tank 10, thus effectively protects the steel against the corrosive action of any liquid contained by the tank. A pipe 17 is connected to flange 12 by bolts (not shown) screwed into tapped holes 18. Another pipe 19 is similarly connected to flange 15.

A bottom member 20 is provided with semi-circular notches 21 and an opening 22 in communication with an opening 23 in flange 12. There are additional small notches 24 in the lower face of member 20. The member 20 is advantageously made as an iron casting entirely covered with a soft rubber lining 25. A top member 26 is juxtaposed to member 20 and provided with semi-circular notches 27 complementary to the notches 21 in member 20. The top member is likewise preferably an iron casting covered with a soft rubber lining 28.

Radially extending pipes 30 and 31 each have one end located in a notch 21 of member 20 and the complementary notch 27 of member 26. The pipes 30 terminate in tees 32 to which are connected pipes 33. The pipes 31 are provided with crosses 34 to which are connected pipes 35. The free ends of pipes 31, 33 and 35 are capped as shown at 36. Pipes 30 and 31 are bent to conform to the contour of the dished bottom 11, as clearly shown in Fig. 2. Pipes 33 and 35 are bent to the shape of sections of rings concentric with the axis of tank 10, as shown in Fig. 1. Pipes 30, 31, 33 and 35 are provided on their lower side with perforations 37. Pipes 30, 31, 33 and 35, tees 32, crosses 34 and caps 36 are preferably made of hard rubber.

Members 20 and 26 are fastened to flange 12 by studs 40 and nuts 41, advantageously made of stainless steel, whereby the ends of pipes 30 and 31 are securely held in their respective notches 21 and 27. The soft rubber linings 25 and 28 extending over the notches 21 and 27, respectively, besides protecting the cast iron of members 20 and 26 against corrosion, perform the additional functions of acting as gasketing means and as cushions preventing any cracking of the relatively brittle hard rubber of pipes 30 and 31. A gasket 42, shown between member 20 and flange 12, is not essential since the soft rubber lining itself is capable of acting as gasket. The nuts 41 and the exposed ends of studs 40 are protected by hard rubber caps 43 screwed on the ends of studs 40 and seating on rubber gaskets 46. In this manner no metal is exposed to direct contact with liquid within tank 10. If desired, additional thin soft rubber gaskets (not shown) may be placed between the contact surfaces of members 20 and 26, and around the ends of pipes 30 and 31 which rest in notches 21 and 27.

After assembling this strainer system in the tank a layer of gravel 44 is placed over it which supports a bed 45 of organic cation exchange material.

In normal service water to be treated enters the tank 10 through pipe 19. (This water is advantageously distributed by a suitable distribution system which, however, has not been shown in the drawings since it forms no part of my invention.) The water passes downwardly through the bed 45 and the gravel layer 44, and is collected uniformly over the entire area of the tank through the openings 37 in the mesh-work formed by pipes 30, 31, 33 and 35. The water then enters the header formed by the juxtaposed members 20 and 26 and is discharged through openings 22 and 23, and pipe 17. The small notches 24 form additional outlets for the space in tank 10 below the pipes 30 and 31, thus preventing the formation of a stagnant pool at that point. In the steps of regenerating and rinsing the flow is the same as in normal service, while in backwashing it is in the opposite direction.

Referring now to the modification shown in Figs. 5 and 6, a horizontal cylindrical tank 50 has in its lower portion three flanges 51, 52 and 53, and in its top portion a flange 54. The tank 50, including said flanges, is covered on the inside with a soft rubber lining 55. To flange 54 is connected a pipe 56, and to flanges 51, 52 and 53 is connected a header piece 57.

Bottom members 60, 61 and 62 with their respective top members 63, 64 and 65 form headers attached, respectively, to flanges 51, 52 and 53. The members 60, 61 and 62 are of similar construction as member 20, previously described, and the members 63, 64 and 65 are similar to member 26, except that they are of oblong shape instead of being round, rows of tubes 66 being held in notches 67 of the top members and notches 68 of the bottom members.

The tubes 66, provided with caps 69 and perforations 70, are made of hard rubber and bent to conform to the curvature of tank 50, as shown. The members 60, 61 and 62 with the respective members 63, 64 and 65 are held together and fastened to flanges 51, 52 and 53, respectively, by rubber capped studs and nuts 71 as previously described, the tubes 66 being thus securely held in their respective notches 67 and 68. Over this strainer system is placed a layer of gravel 72 supporting a bed of cation exchange material 73.

Operation of the modification shown in Figs. 5 and 6 is the same as that of the system shown in Figs. 1 to 4.

In both forms of my invention disclosed herein water and regenerant are uniformly collected or distributed, respectively, over the entire bottom area of the tank, thus insuring uniformly distributed flow through the bed of cation exchange material. No metal is exposed to corrosive attack by the liquids, the steel tank as well as the cast iron bottom and top members being completely lined with soft rubber, the studs and nuts being protected by hard rubber caps, and the pipes and fittings of the strainer system being made of hard rubber. The system is simple and inexpensive in manufacture, and efficient and troublefree in prolonged use.

While I have shown what I consider preferred forms, modifications may be made without departing from the spirit of my invention, and reference is, therefore, made to the appended claims for a definition of the scope of my invention.

What I claim is:

1. A liquid treatment structure comprising a tank having a bottom, and a strainer system which comprises two members forming a header, complementary notches in each of said members, a plurality of perforated tubes each having one end located in one notch of one of said members and in a complementary notch of the other member, a flange in the bottom of the tank, means for fastening said members to said flange and for securely holding said tubes in their respective notches, and a passage extending from said header through said flange.

2. A liquid treatment structure comprising a tank having a bottom, and a strainer system which comprises two rubber lined castings juxtaposed to form a header, complementary notches in each of said castings, a plurality of perforated hard rubber tubes adjacent the bottom of the tank, each tube having one end located in one notch of one of said castings and in a complementary notch of the other casting, means for clamping said two castings together with said tubes therebetween, and a passage for liquid extending from said header to the outside of the tank.

3. A liquid treatment structure comprising an upright cylindrical tank having a dished bottom, and a strainer system which comprises a flange centrally located in the bottom of the tank, two rubber lined iron castings juxtaposed to form a header, complementary notches in each of said castings, a plurality of perforated hard rubber tubes adjacent the dished bottom and bent to conform to the contour of the bottom, each tube having one end located in one notch of one of said castings and in a complementary notch of the other casting, means for fastening both said castings to said flange and for securely holding said tubes in their respective notches, and a passage for liquid extending from said header through said flange.

4. A liquid treatment structure comprising an upright cylindrical tank having a dished bottom, and a strainer system which comprises a flange centrally located in the bottom of the tank, two rubber lined iron castings juxtaposed to form a header, complementary notches in each of said castings, a plurality of perforated hard rubber tubes adjacent the dished bottom and bent to conform to the contour of the bottom, each tube having one end located in one notch of one of said castings and in a complementary notch of the other casting, means for fastening both said castings to said flange and for securely holding said tubes in their respective notches, additional perforated hard rubber tubes extending at right angles from said first mentioned tubes and bent to the shape of sections of rings concentric with the axis of the tank, and a passage for liquid extending from said header through said flange.

5. A liquid treatment structure comprising a horizontal cylindrical tank, and a strainer system which comprises a plurality of spaced flanges in the cylindrical portion of the tank, a header piece on the outside of the tank connected with said flanges, a plurality of headers on the inside of the tank, each of said headers comprising two separate oblong members, complementary notches in opposite sides of each of said members, a plurality of parallel perforated tubes bent to conform to the contour of the tank, each tube having one end located in one notch of one of said members and in a complementary notch of the other member, means for clamping said two members together with said tubes therebetween, and a passage from each of said headers through one of said flanges to said header piece.

6. The liquid treatment structure of claim 5, each of said members being an iron casting lined with relatively soft rubber, and said perforated tubes being of hard rubber.

NORMAN E. BRICE.